Figure 1:
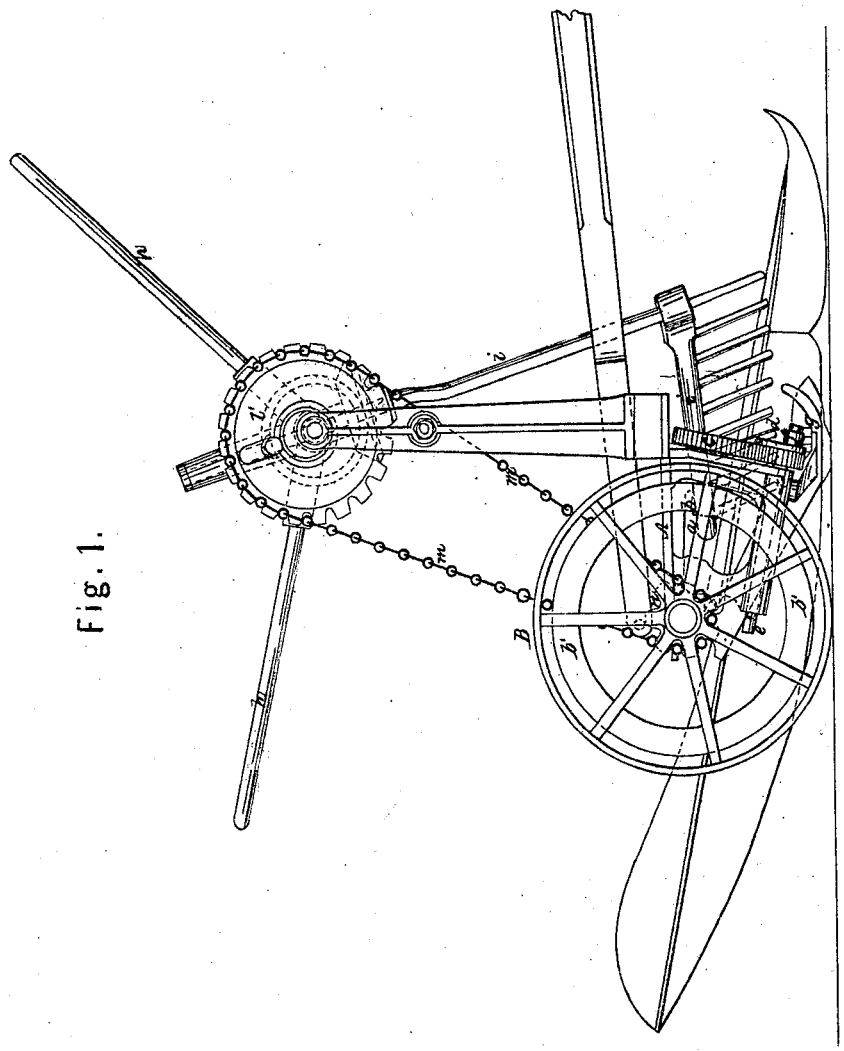

United States Patent Office.

JOSEPH E. HOVER, OF PHILADELPHIA, PENNSYLVANIA.

Letters Patent No. 71,174, dated November 19, 1867.

IMPROVED PASTE.

The Schedule referred to in these Letters Patent and making part of the same.

TO ALL WHOM IT MAY CONCERN:

Be it known that I, JOSEPH EVES HOVER, of Philadelphia, Pennsylvania, have invented an Improved Paste; and I do hereby declare the following to be a full, clear, and exact description of the manner in which the same is made.

To one gallon of boiling water are added about ten ounces of wheat or other suitable flour. The mixture is thoroughly stirred, and about one pint of acetic acid or vinegar is then added to the same. After the materials are thoroughly combined, the composition is allowed to cool, when it may be used in the same manner as ordinary paste or mucilage.

I have ascertained that a paste made as above described possesses strong adhesive properties, will not change in color, ferment, or become mouldy under any circumstances, and is therefore especially adapted for transportation and for use in climates where the ordinary pastes would soon be destroyed.

Without confining myself to the precise proportions specified, of the within-named ingredients, I claim as my invention, and desire to secure by Letters Patent—

A paste consisting of the within-named ingredients, combined substantially as specified.

In testimony whereof I have signed my name to this specification in the presence of two subscribing witnesses.

JOS. E. HOVER.

Witnesses:
   CHAS. E. FOSTER,
   C. B. PRICE.

Howard & Bousfield.
Harvester Rake.

№ 71175. Patented Nov. 19, 1867.

Sheet 1.
3 Sheets.

Inventors.
James Howard
Edward Tenney Bousfield
By their Attorney J Russell Parsons